April 25, 1967   R. D. LLOYD   3,316,028
METHOD AND APPARATUS FOR REMOVING BLOCKAGE OF
MATERIAL IN TRANSPORTING CONDUITS
Filed Jan. 4, 1965
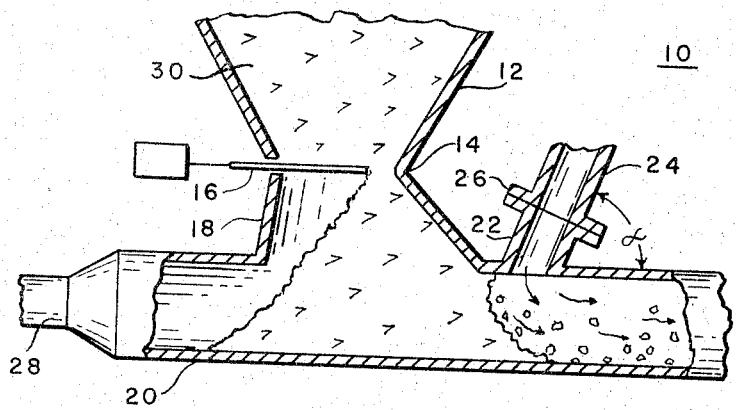
Fig. I
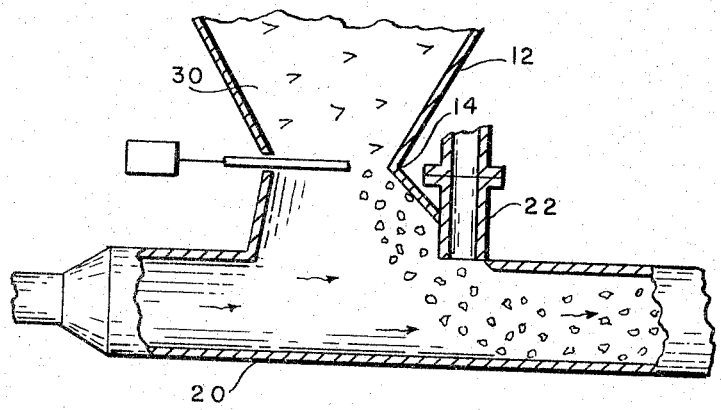
Fig. II
ROBERT D. LLOYD   INVENTOR.
BY James C. Logomasini
ATTORNEY.

United States Patent Office 3,316,028
Patented Apr. 25, 1967

3,316,028
METHOD AND APPARATUS FOR REMOVING BLOCKAGE OF MATERIAL IN TRANSPORTING CONDUITS
Robert D. Lloyd, North Wilbraham, Mass., assignor to Monsanto Company, a corporation of Delaware
Filed Jan. 4, 1965, Ser. No. 423,056
1 Claim. (Cl. 302—52)

This invention relates to improved apparatus for unloading receptacles. More particularly, this invention relates to a pressure device which is utilized to eliminate blockage if it occurs when finely-divided materials are being discharged from a receptacle.

Manual transfer of large quantities of finely divided material from one location to another is no longer considered economically feasible. Consequently, various automatic systems have been designed such as, for example, pneumatic systems which convey the material from one point to another in an air current. Unfortunately, the effect of this type of system has been severely limited by operational problems, the most important of which is the tendency of the finely divided material to clog or plug particularly at joints or turns within the system.

Accordingly, it is a primary object of this invention to provide an improved unloading apparatus.

It is another object of this invention to provide unloading apparatus which can be used to quickly discharge finely divided materials from a receptacle into a transfer conduit.

It is another object of this invention to provide unloading apparatus which is adapted to eliminate blockage if it occurs when finely divided materials are being discharged from a receptacle into a transfer conduit.

It is a further object of this invention to provide unloading apparatus which utilizes a pressure device to clear blockage of finely divided materials which may occur when receptacles are being discharged into a transfer conduit.

These and other objects are attained in an apparatus which comprises, in combination, a receptacle, capable of containing finely divided material, having a discharge opening disposed in the bottom thereof, a material transfer conduit under and in communication with said discharge opening and a pressure producing device penetrating said transfer conduit downstream of and adjacent said discharge opening.

The following drawings are provided for the purpose of illustrating various embodiments of the present invention.

FIGURE I is a side view, partly in section and with parts broken, illustrating a hopper and a pressure producing device as used in the present invention.

FIGURE II is a side view, partly in section and with parts broken, illustrating the same embodiment shown in FIGURE I except that the pressure producing device is inserted in the discharge collar connecting the hopper to the material transfer conduit.

Referring in detail to the figures of the drawings and more specifically FIGURE I, there is schematically shown a hopper unloading apparatus 10 which comprises a hopper 12 having a discharge opening 14 equipped with a gate 16, which is connected via a diverging collar 18 to a substantially horizontal conduit 20. Almost immediately adjacent collar 18 is an air injection nozzle 22. Air injection nozzle 22 is connected to a source of air, not shown, which enters through the partially shown conduit 24 which is connected by flange 26 to the air injection nozzle 22. The air entering nozzle 22 produces a positive pressure which forces the finely divided material along the transfer conduit.

In operation finely divided material 30 within hopper 12 is permitted to discharge into conduit 20 by opening gate 16. Movement of air emanating from intake pipe 28 along conduit 20 has been initiated prior to the opening of gate 16. Under normal conditions, the air moving along conduit 20 should be sufficient to transport the material discharging from hopper 12 along and out of conduit 20. However, as often happens, an unusually large quantity of material falling from hopper 12 at any time will tend to plug the diverging collar 18 and the conduit 20 underneath such as shown in FIGURE I. When the conduit is completely blocked, the conveying air flow will be arrested. When this happens, a secondary flow of air is then initiated through conduit 24 and air injection nozzle 22 to provide a sweeping effect on the surface of the entrapped material. This will continue until the bulk of the trapped material is sufficiently removed to permit the former directional flow of air to resume. Consequently, this system provides a rather unique but simple anti-blocking apparatus for hopper discharge.

In FIGURE I, the air injection device is inserted into the material transfer conduit close to the hopper discharge. However, it is generally preferable depending somewhat on the type of material being discharged to insert the air injection nozzle into the collar connecting the hopper to the material transfer conduit. FIGURE II illustrates just such an embodiment.

In general, the present invention comprises feeding finely divided material from a receptacle into an air conveying duct and clearing any material blockage which may occur below the receptacle in the conduit by causing a flow of air immediately adjacent the receptacle discharge to be directed against portions of the blocked mass. In general, the flow rate of the air required to clear the system will vary depending on the type of material being conveyed and the respective cross-sections of the material transfer conduit and the air injection nozzle. The cross-section of the air injection nozzle may vary within wide limits but is generally less than the cross-section of the material transfer conduit. For optimum results, the cross-section of the air injection nozzle should be ¼ to ¾ or more preferably ⅓ to ½ times the cross-sectional area of the material transfer conduit. The velocity of the air emanating from the air injection nozzle is considered important and will generally vary depending for the most part on the type of material being transported. Some materials will be heavier than others or have a greater tendency to pack thereby requiring higher velocities to loosen the surface material from the clogged mass. Consequently, when determining the optimum air velocity, the bulk density and the packing properties of the material must be taken into account. In addition to the nozzle cross-section, the angle at which the air injection nozzle is directed into the material transfer conduit is important as well as the distance between the nozzle and the discharge collar connecting the hopper to the material transfer conduit. For optimum results, the downstream angle (this would be the angle α shown in FIGURE I) between the longitudinal axis of the material transfer conduit and longitudinal axis of the nozzle will vary between 45 to 135 and more preferably between 55 to 100 degrees.

As earlier indicated, the nozzle is preferably inserted in a diverging collar member such as illustrated in FIGURE II. However, it is also possible to position the nozzle in the conduit close to the collar portion connecting the receptacle to the transfer conduit or partially in both. The important consideration is that the nozzle be positioned close enough to the blocked material within that portion of the conduit below the receptacle to allow air to strike portions of the blocked mass in order to break up the mass and to carry the loosened material downstream. On the other hand, the nozzle should not be inserted so close to the middle of the discharge collar that material, after it has become clogged, will present considerable resistance to the air flow.

The air which enters the nozzle can be from any suitable source such as an air pump, fan, etc. The pump or fan can be connected to duct work or tubing leading to the nozzle so that a positive flow of air will enter through the nozzle into the conduit or the pump or fan could be connected downstream of the conduit to create a negative pressure which will draw air through the nozzle.

Although the embodiment which is illustrated employs a circular discharge and a cylindrical conveying tube, it is obvious that any cross-sectional shape may be utilized. For example, square, rectangular, hexagonal, etc., cross-sectional devices may be used if desired. As pointed out, the relative size of the transfer conduit and the injection nozzle are important while the size of the receptacle or hopper which is employed is not considered critical. Likewise, the wall thickness of the transfer conduit and hopper are not critical and will be determined by the type of materials being utilized and the size of the structure. These wall structures may vary from rather thin, e.g., 1/16 inch to reasonably thick, e.g., 3/4 inch.

The materials of construction used in the practice of this invention are not critical and will be determined by persons skilled in the art to achieve maximum utility with minimum weight. For example, typical materials of construction may include some of the better known metals such as steel, aluminum, bronze, etc., and may even include rigid plastics such as methacrylate, resins, vinyl chloride polymers and copolymers, fluorocarbon polymers, polyamides, and the like.

The materials which may be unloaded by means of described apparatus are not critical and may be any of the various materials which are generally stored or transported in bulk, e.g., polystyrene pellets, polyvinyl chloride pellets, polyethylene pellets, polypropylene pellets, various copolymers of styrene, ethylene, propylene, etc. with other monomers, etc. The invention is most useful in the conveyance of finely divided materials which may range from very small particles to very large particles and which may range from almost liquid to very hard particles.

The invention has been illustrated with certain representative embodiments and details which have been shown for the purpose of illustration. It will be apparent to those skilled in the art that various changes and embodiments may be made without departing from the spirit and scope of the invention.

What is claimed is:

An apparatus designed to clear material blockage which may occur when finely divided materials are being discharged from a receptacle into a transfer conduit which comprises in combination; a receptacle, capable of containing finely divided material, having a discharge opening disposed in the bottom thereof; a material transfer conduit positioned under and in communication with said discharge opening; and a pressure producing device, said device comprising a nozzle having a cross-section 1/4 to 3/4 times the cross-section of said material transfer conduit and traversing the wall of said transfer conduit next to and downstream of said discharge opening at an angle traversing the surface of repose of materials entering said transfer conduit from said discharge opening, and said nozzle being connected to a positive air source.

References Cited by the Examiner

UNITED STATES PATENTS

| | | | |
|---|---|---|---|
| 600,547 | 3/1898 | Mazzanovich | 302—52 X |
| 749,206 | 1/1904 | Limbert | 302—24 |
| 2,536,402 | 1/1951 | Voorhees | 302—36 |

FOREIGN PATENTS 963,408   7/1949   Germany.

ANDRES H. NIELSEN, *Primary Examiner.*

EVON C. BLUNK, *Examiner.*

A. L. LEVINE, *Assistant Examiner.*